US012130564B2

(12) United States Patent
Takeda

(10) Patent No.: US 12,130,564 B2
(45) Date of Patent: Oct. 29, 2024

(54) IMAGE FORMING APPARATUS

(71) Applicant: TOSHIBA TEC KABUSHIKI KAISHA, Tokyo (JP)

(72) Inventor: Kazuhisa Takeda, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 17/940,119

(22) Filed: Sep. 8, 2022

(65) Prior Publication Data

US 2024/0085820 A1 Mar. 14, 2024

(51) Int. Cl.
*G03G 15/08* (2006.01)

(52) U.S. Cl.
CPC . *G03G 15/0808* (2013.01); *G03G 2215/0607* (2013.01)

(58) Field of Classification Search
CPC .................. G03G 15/0808; G03G 2215/0607
See application file for complete search history.

(56) References Cited

U.S. PATENT DOCUMENTS 5,038,176 A * 8/1991 Yokoyama ......... G03G 15/0126 399/236
2006/0216061 A1* 9/2006 Yamaguchi .......... G03G 21/185 399/113
2009/0010689 A1* 1/2009 Koyama ............ G03G 15/0896 384/255
2010/0104319 A1* 4/2010 Saitoh .................. G03G 15/346 399/111
2011/0222903 A1* 9/2011 Kishi ................. G03G 21/1842 399/111
2019/0391526 A1* 12/2019 Nagata ............... G03G 15/0806
2020/0340522 A1* 10/2020 Muneda .................. F16C 17/02
2021/0271199 A1 9/2021 Tanaka
2021/0349421 A1* 11/2021 Ooka ................. G03G 21/1821

FOREIGN PATENT DOCUMENTS

JP 6-167869 6/1994
JP 2011-75729 4/2011

* cited by examiner

*Primary Examiner* — Sevan A Aydin
(74) *Attorney, Agent, or Firm* — Amin, Turocy & Watson, LLP

(57) ABSTRACT

An image forming apparatus according to an embodiment includes an image bearing body, a developing roller, a housing, and a gap adjusting member. The image bearing body includes a first rotating shaft and includes a first surface on which a latent image is formed. The developing roller includes a second rotating shaft, includes a second surface, includes a bearing, and supplies a developer to the latent image and develops the latent image. The housing rotatably supports the second rotating shaft. The gap adjusting member includes a shaft hole for rotatably receiving one end of the first rotating shaft and includes a cam surface. The gap adjusting member is turned around the first rotating shaft and is fixed to the housing in a turning position where a gap is uniform in a direction of the second rotating shaft of the developing roller.

20 Claims, 5 Drawing Sheets

IMAGE FORMING APPARATUS

FIELD

Embodiments described herein relate generally to an image forming apparatus including a developing device that uses a two-component developer, the image forming apparatus being set in, for example, a workplace.

BACKGROUND

An image forming apparatus such as a copying machine includes, for example, a scanner, a photoconductive drum, a developing device, a transfer device, and a fixing device. The scanner reads an image of a document. The photoconductive drum includes a surface on which a latent image based on the read image is formed. The developing device supplies a developer to the latent image on the photoconductive drum and develops the latent image. The transfer device transfers the developed developer image onto paper. The fixing device fixes the transferred developer image on the paper.

In the image forming apparatus including the developing device that uses the two-component developer, the surface of a photoconductive drum and the surface of a developing roller are opposed via a fixed gap. In order to synchronously rotate the photoconductive drum and the developing roller, a gear provided at one end of a rotating shaft of the photoconductive drum and a gear provided at one end of a rotating shaft of the developing roller are meshed with each other. If the two gears are meshed and the developing roller and the photoconductive drum are rotated, stress is generated in a direction in which the one end of the rotating shaft of the photoconductive drum and the one end of the rotating shaft of the developing roller approach.

If the one end of the rotating shaft of the photoconductive drum and the one end of the rotating shaft of the developing roller approach, a gap between the surface of the photoconductive drum and the surface of the developing roller becomes nonuniform in an axial direction. In this case, the concentration of a developer image formed on the surface on one end side of the photoconductive drum is higher than on the other end side and concentration unevenness occurs in the image.

DETAILED DESCRIPTION

Figure 1:
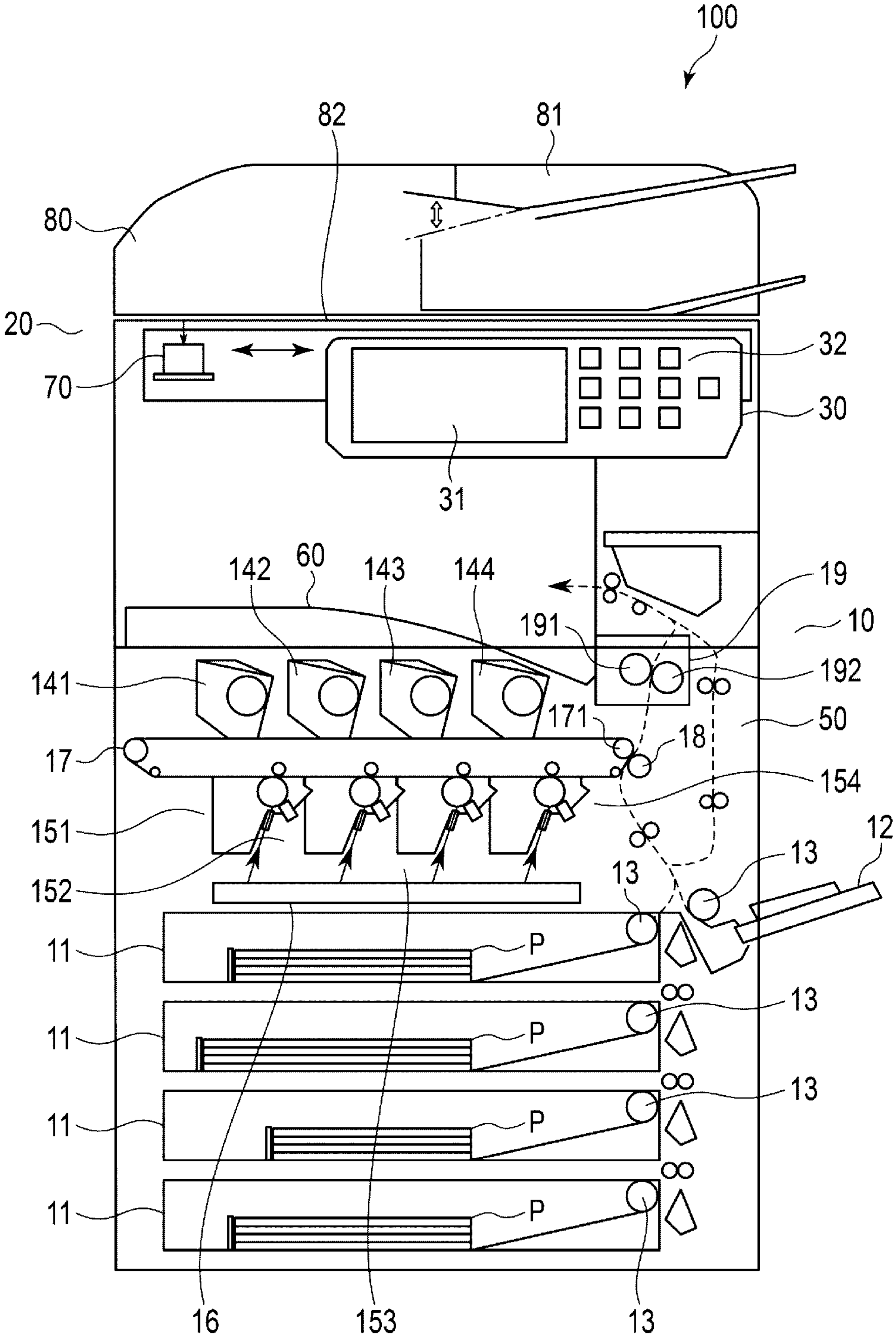
FIG. 1 is a schematic diagram illustrating an image forming apparatus according to an embodiment.

An image forming apparatus according to an embodiment includes an image bearing body, a developing roller, a housing, and a gap adjusting member. The image bearing body is cylindrical and includes a first rotating shaft and includes a first surface on which a latent image is formed. The developing roller includes a second rotating shaft, includes a second surface opposed to the first surface of the image bearing body via a gap, includes a bearing at one end of the second rotating shaft, and supplies a developer to the latent image and develops the latent image. The housing rotatably supports the second rotating shaft of the developing roller. The gap adjusting member includes a shaft hole for rotatably receiving one end of the first rotating shaft of the image bearing body opposed to the one end of the second rotating shaft of the developing roller and includes a cam surface, a distance of which from a center of the shaft hole varies in a turning direction. The gap adjusting member is turned around the first rotating shaft in a state in which the cam surface is set in contact with the bearing, the gap adjusting member being fixed to the housing in a turning position where the gap is uniform in a direction of the second rotating shaft of the developing roller.

An image forming apparatus according to an embodiment is explained below with reference to the drawings. In the drawings referred to in the following explanation of the embodiment, scales of units are sometimes changed as appropriate. In the drawings referred to the following explanation of the embodiment, components are sometimes omitted in order to clarify the explanation.

The image forming apparatus in this embodiment is an apparatus that forms an image using a two-component developer such as an MFP (multifunction peripheral) or a copying machine. An image forming apparatus 100 illustrated in FIG. 1 is an MFP.

The image forming apparatus 100 includes, for example, a printing function, a scan function, a copy function, a decoloring function, and a facsimile function. The printing function is a function of forming a toner image on paper P (a transfer medium). The scan function is a function of reading an image from a document or the like on which the image is formed. The copy function is a function of printing, for example, the image read from the document using the scan function on the paper P using the printing function. The decoloring function is a function of decoloring an image formed by a decolorable developer on the paper P.

The image forming apparatus 100 includes a printer 10, a scanner 20, and an operation panel 30.

The printer 10 includes a plurality of paper feeding cassettes 11, a manual feed tray 12, and a plurality of paper feeding rollers 13. The paper feeding cassettes 11 store the paper P used for printing. The manual feed tray 12 is a tray for manually feeding the paper P. The paper feeding rollers 13 rotate to thereby selectively take out the paper P from the paper feeding cassettes 11 or the manual feed tray 12.

The printer 10 includes four toner cartridges 141, 142, 143, and 144, four image forming units 151, 152, 153, and 154, an optical scanning device 16, a transfer belt 17, a secondary transfer roller 18, and a fixing unit 19. The transfer belt 17 and the secondary transfer roller 18 function as a transfer unit.

The toner cartridges 141 to 144 respectively store toners supplied to the image forming units 151 to 154. The toners referred to herein are two-component developers obtained by mixing toners and a carrier. The toner cartridge 141 stores yellow (Y) toner. The toner cartridge 142 stores magenta (M) toner. The toner cartridge 143 stores cyan (C) toner. The toner cartridge 144 stores black (K) toner. A combination of the colors of the toners is not limited to YMCK and may be another combination. The toners may be toners that are decolored at temperature higher than a predetermined temperature.

The image forming units 151 to 154 respectively receive supply of the toners from the toner cartridges 141 to 144 and form toner images of different colors. The image forming unit 151 forms a yellow (Y) toner image. The image forming unit 152 forms a magenta (M) toner image. The image forming unit 153 forms a cyan (C) toner image. The image forming unit 154 forms a black (K) toner image.

Figure 2:
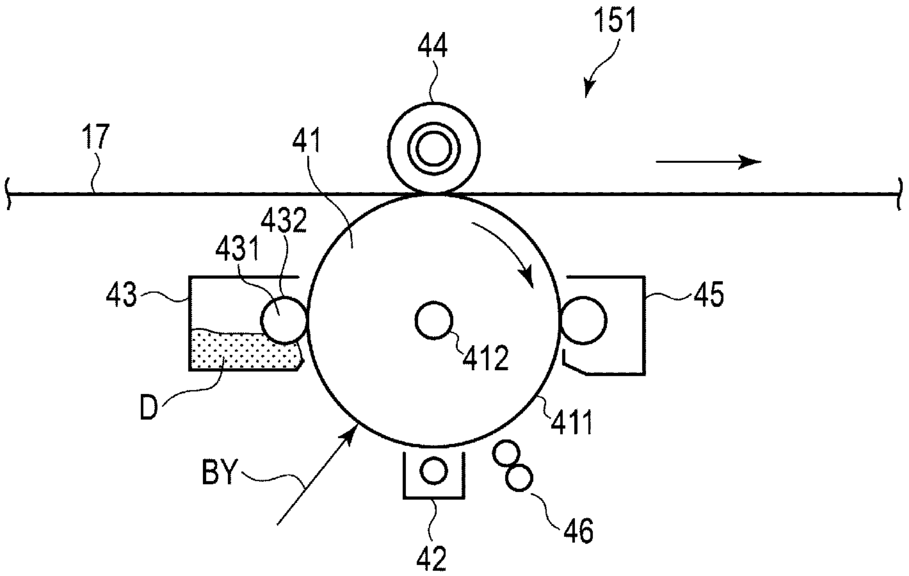
FIG. 2 is a schematic diagram illustrating an image forming unit of the image forming apparatus illustrated in FIG. 1.

The image forming units 151 to 154 have the same configuration except that the toners are different. Accordingly, the image forming unit 151 for yellow is representatively explained herein with reference to FIG. 2. Explanation of the image forming units 152 to 154 for the other colors is omitted.

The image forming unit 151 for yellow includes a photoconductive drum 41 (an image bearing body), a charging device 42, a developing device 43, a primary transfer roller 44, a cleaner 45, and a discharge lamp 46.

The photoconductive drum 41 includes a surface 411 (a first surface) that receives a light beam BY irradiated from the optical scanning device 16. The photoconductive drum 41 is cylindrical and includes a rotating shaft 412 (a first rotating shaft). The optical scanning device 16 forms an electrostatic latent image on the surface 411 of the photoconductive drum 41. The charging device 42 charges the surface 411 of the photoconductive drum 41 with a positive charge. The developing device 43 develops the electrostatic latent image on the surface 411 of the photoconductive drum 41 using yellow toner D supplied from the toner cartridge 141. That is, the developing device 43 forms a yellow toner image on the surface 411 of the photoconductive drum 41.

The image forming unit 151 includes the primary transfer roller 44 in a position opposed to the surface 411 of the photoconductive drum 41 across the transfer belt 17. The primary transfer roller 44 generates a transfer voltage between the primary transfer roller 44 and the photoconductive drum 41. Consequently, the primary transfer roller 44 transfers (primarily transfers) the toner image on the surface 411 of the photoconductive drum 41 onto the surface of the transfer belt 17 that is in contact with the photoconductive drum 41.

The cleaner 45 removes the toner remaining on the surface 411 of the photoconductive drum 41. The discharge lamp 46 removes electric charges remaining on the surface 411 of the photoconductive drum 41.

The optical scanning device 16 irradiates, according to image data input thereto, the surfaces 411 of the photoconductive drums 41 of the image forming units 151, 152, 153, and 154 respectively with light beams BY, BM, BC, and BK. The light beams BY, BM, BC, and BK are respectively based on image data of colors obtained by separating the image data into colors Y, M, C, and K. The optical scanning device 16 emits the light beam BY and forms an electrostatic latent image for yellow on the surface 411 of the photoconductive drum 41 of the image forming unit 151 according to image data of a Y component. Similarly, the optical scanning device 16 emits the light beams BM, BC, and BK and forms electrostatic latent images for the colors on the surfaces 411 of the photoconductive drums 41 of the image forming units 152, 153, and 154 according to image data of M, C, and K components.

The image data input to the optical scanning device 16 is, for example, image data read from a document or the like by the scanner 20. Alternatively, the image data input to the optical scanning device 16 is image data transmitted from an apparatus different from the image forming apparatus 100 to the image forming apparatus 100.

The transfer belt 17 is endlessly stretched. The transfer belt 17 rotates according to rotation of a driving roller 171 on which the transfer belt 17 is wound. The transfer belt 17 rotates to thereby carry the toner images of the colors formed to be superimposed on the surface of the transfer belt 17 by the image forming units 151 to 154 to a transfer region opposed to the secondary transfer roller 18.

The secondary transfer roller 18 is opposed to the driving roller 171 across the transfer belt 17. The secondary transfer roller 18 transfers (secondarily transfers) the toner image formed on the transfer belt 17 onto the paper P passing between the transfer belt 17 and the secondary transfer roller 18.

The fixing unit 19 heats and pressurizes the paper P. The fixing unit 19 includes a heating roller 191 and a pressurizing roller 192 opposed to each other across a conveying path for the paper P. The heating roller 191 includes a heat source such as a heater. The heating roller 191 heated by the heat source heats the paper P. The pressurizing roller 192 pressurizes the paper P passing between the pressurizing roller 192 and the heating roller 191. Accordingly, the fixing unit 19 melts the toner image transferred on the paper P and fixes the toner image on the paper P.

The printer 10 includes a duplex unit 50 and a paper discharge tray 60 besides the above. The duplex unit 50 enables the paper P to be printed on a rear surface. The duplex unit 50 switches back the paper P to thereby reverse the front and the rear of the paper P and sends the paper P into a transfer region between the transfer belt 17 and the secondary transfer roller 18. The paper discharge tray 60 is a tray for discharging the paper P on which printing is finished.

The scanner 20 reads an image from a document or the like. The scanner 20 includes a reading module 70 and a document feeding device 80. The reading module 70 irradiates a surface of a document (hereinafter referred to as document surface) including a reading target image with illumination light, receives reflected light of the illumination light with a not-illustrated image sensor, and converts the reflected light into a digital signal. Consequently, the reading module 70 reads the image from the document surface.

The document feeding device 80 is, for example, an ADF (auto document feeder). The document feeding device 80 conveys documents placed on a document tray 81 one after another through a document glass 82. The reading module 70 reads an image from a document conveyed to the document glass 82. The document feeding device 80 includes another reading module for reading an image from the rear surface of the document.

The operation panel 30 is a man-machine interface that performs input and output between the image forming apparatus 100 and an operator of the image forming apparatus 100. The operation panel 30 includes, for example, a touch panel 31 and an input device 32.

The touch panel 31 is, for example, a touch panel obtained by stacking a display such as a liquid crystal display or an organic EL display and a pointing device operated by touch input. The display of the touch panel 31 displays a screen for notifying various kinds of information to the operator of the image forming apparatus 100. The touch panel 31 receives touch operation by the operator.

The input device 32 receives operation by the operator of the image forming apparatus 100. The input device 32 is, for example, a keyboard, a keypad, or a touchpad.

Figure 3:
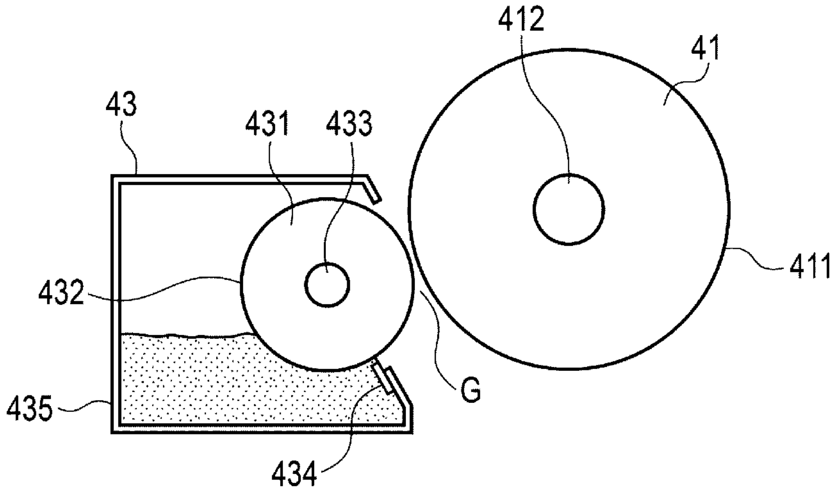
FIG. 3 is a schematic diagram in which a photoconductive drum and a developing roller illustrated in FIG. 2 are viewed from a front side.

As in the image forming apparatus 100 in this embodiment, if the developing device 43 forms a toner image using the two-component developer, as illustrated in FIG. 3, it is necessary to provide a uniform gap G between the surfaces 411 of the photoconductive drums 41 of the colors and a surface 432 (a second surface) of a developing roller 431. The gap G is necessary for forming a magnetic brush on the surface 432 of the developing roller 431.

The developing device 43 includes a doctor blade 434 (a restricting member) separated from and opposed to the surface 432 of the developing roller 431. The doctor blade 434 has a rectangular plate shape long in the direction of a rotating shaft 433 (a second rotating shaft) of the developing roller 431. A case 435 of the developing device 43 is attached in a posture in which the doctor blade 434 is parallel to the rotating shaft 433 such that an end edge in the longitudinal direction of the doctor blade 434 is separated from and opposed to the surface 432 of the developing roller 431. The doctor blade 434 restricts the thickness of the developer on the surface 432 of the developing roller 431 to fixed thickness.

A gap adjusting mechanism 90 in a first embodiment for making the gap G between the surface 411 of the photoconductive drum 41 and the surface 432 of the developing roller 431 uniform in the axial direction is explained below with reference to FIGS. 3 to 7. Note that the gap adjusting mechanism 90 provided in the image forming unit 151 for yellow is representatively explained. Explanation of the gap adjusting mechanisms provided in the image forming units 152, 153, and 154 for the other colors is omitted.

Figure 4:
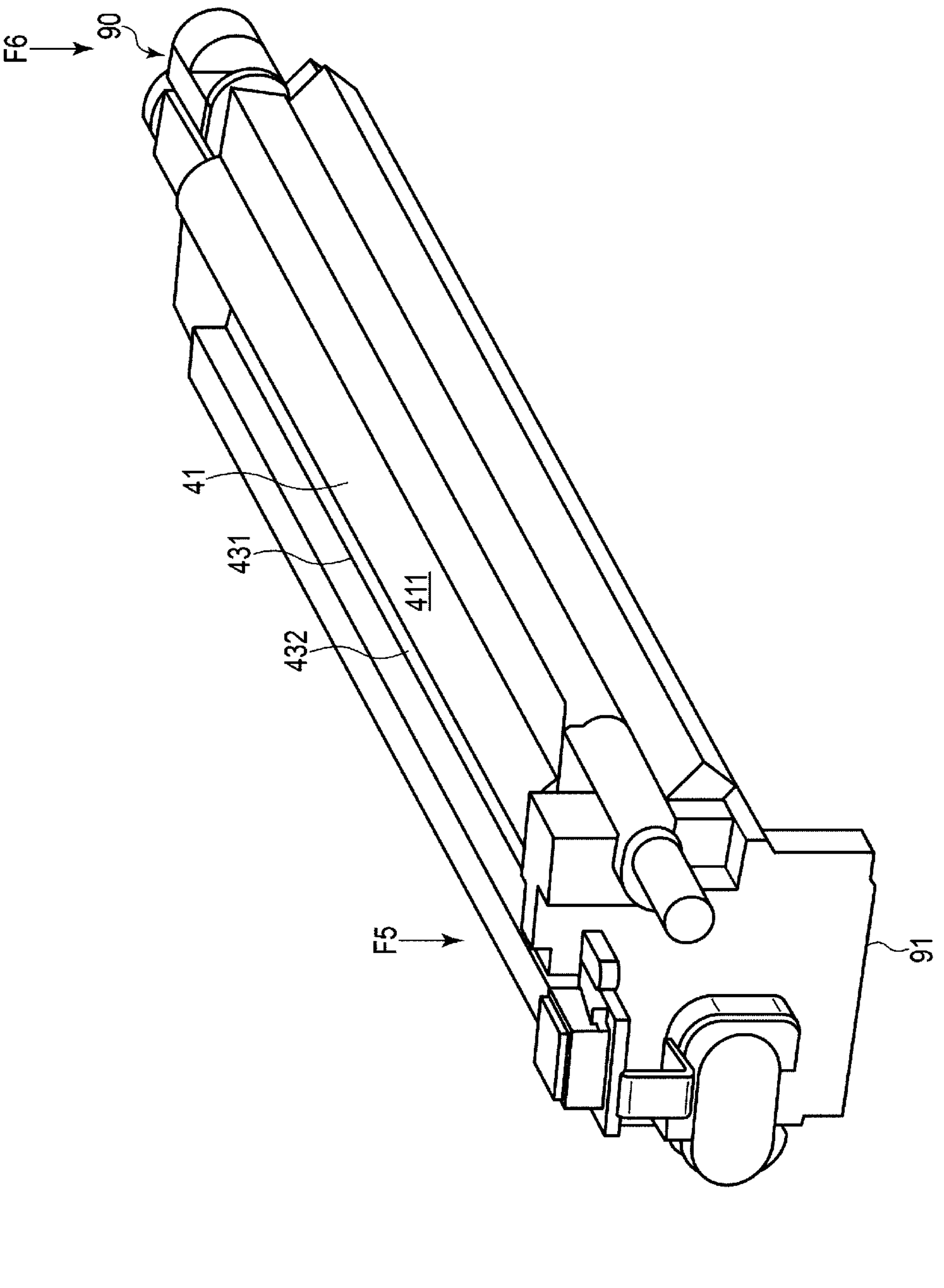
FIG. 4 is a perspective view illustrating a state in which a bearing member is attached on the front side of the photoconductive drum and the developing roller illustrated in FIG. 3.

As illustrated in FIG. 3, the photoconductive drum 41 is disposed substantially in parallel to the developing roller 431 in order to make the gap G between the photoconductive drum 41 and the developing roller 431 uniform. A bearing member 91 illustrated in FIG. 4 is present at an end portion (another end in claims) on a front side (a paper surface near side) of the photoconductive drum 41 and the developing roller 431.

Figure 5:
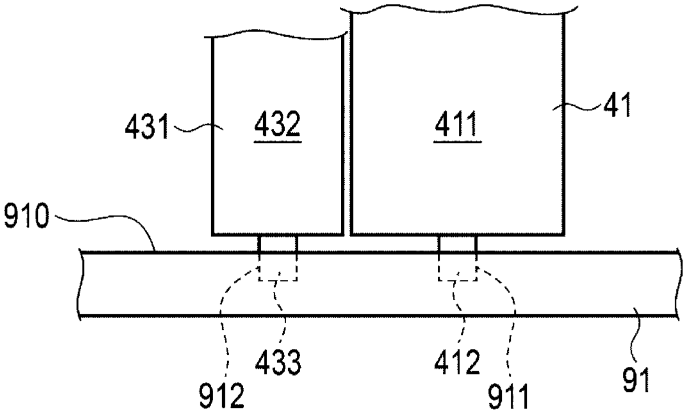
FIG. 5 is a plan view in which the front side of the photoconductive drum and the developing roller illustrated in FIG. 4 is viewed from an arrow F5 direction.

The bearing member 91 includes, as illustrated in FIG. 5, on an inner surface 910 on the side of the photoconductive drum 41 and the developing roller 431, a bearing hole 911 (a first bearing section) that rotatably receives the other end of the rotating shaft 412 of the photoconductive drum 41 and a bearing hole 912 (a second bearing section) that rotatably receives the other end of the rotating shaft 433 of the developing roller 431. The inner diameter of the bearing hole 911 is slightly larger than the outer diameter of the rotating shaft 412 of the photoconductive drum 41. The inner diameter of the bearing hole 912 is slightly larger than the outer diameter of the rotating shaft 433 of the developing roller 431. Accordingly, the other end of the rotating shaft 412 of the photoconductive drum 41 and the other end of the rotating shaft 433 of the developing roller 431 are incapable of moving in directions in which the other ends separate from and approach each other.

Figure 6:
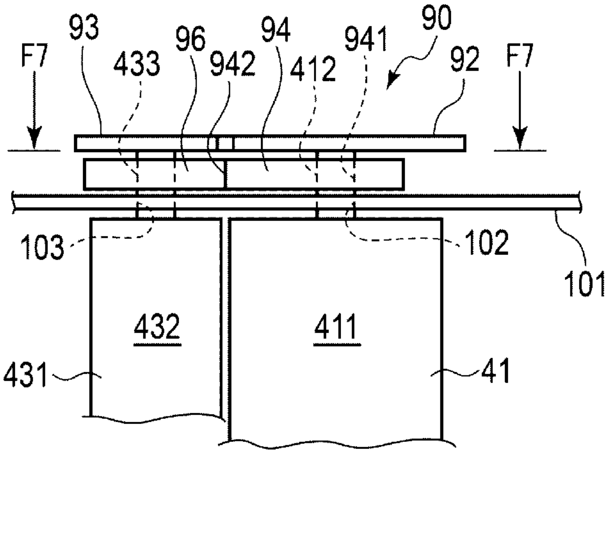
FIG. 6 is a plan view in which a gap adjusting mechanism according to a first embodiment provided on a rear side of the photoconductive drum and the developing roller illustrated in FIG. 4 is viewed from an arrow F6 direction.

As illustrated in FIG. 6, the gap adjusting mechanism 90 is present on a rear side of the photoconductive drum 41 and the developing roller 431. A housing 101 of the image forming apparatus 100 includes bearing holes 102 and 103 through which one end on the rear side of the rotating shaft 412 of the photoconductive drum 41 and one end on the rear side of the rotating shaft 433 of the developing roller 431 are rotatably inserted while respectively having backlashes. That is, one end of the rotating shaft 412 of the photoconductive drum 41 and one end of the rotating shaft 433 of the developing roller 431 are capable of slightly moving in direction in which the one ends separate from and approach each other. The gap adjusting mechanism 90 finely adjusts the distance between the one end of the rotating shaft 412 of the photoconductive drum 41 and the one end of the rotating shaft 433 of the developing roller 431 to thereby adjust the gap G between the surface 411 of the photoconductive drum 41 and the surface 432 of the developing roller 431 to be uniform in the axial direction.

The rotating shaft 412 of the photoconductive drum 41 includes a gear 92 (a first gear) fixed to the one end of the rotating shaft 412. The rotating shaft 433 of the developing roller 431 includes a gear 93 (a second gear) fixed to the one end of the rotating shaft 433. The two gears 92 and 93 are meshed with each other. That is, the photoconductive drum 41 and the developing roller 431 rotate in opposite directions in synchronization with each other.

If the two gears 92 and 93 are meshed and the photoconductive drum 41 and the developing roller 431 are rotated in synchronization with each other in this way, stress is generated in directions in which the one end of the rotating shaft 412 of the photoconductive drum 41 and the one end of the rotating shaft 433 of the developing roller 431 approach. Accordingly, the one end side of the rotating shaft 412 of the photoconductive drum 41 and the one end side of the rotating shaft 433 of the developing roller 431 tend to approach.

Figure 7:
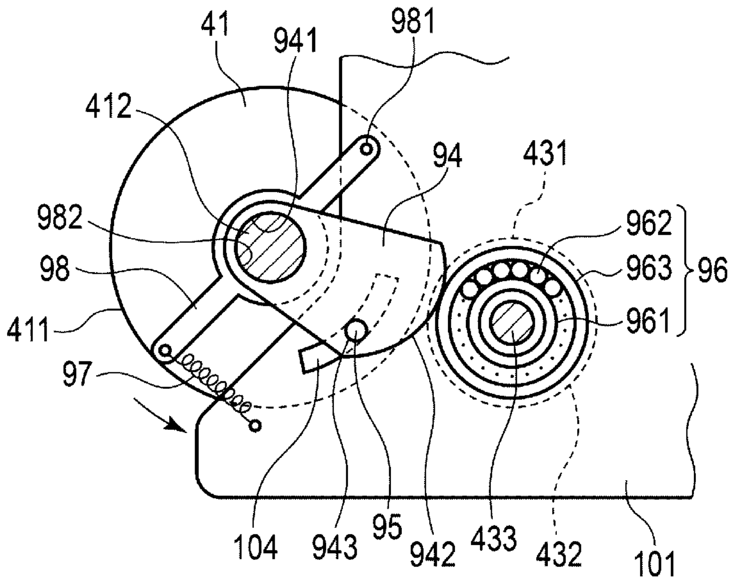
FIG. 7 is a front view of the gap adjusting mechanism in which a bearing and a cam member illustrated in FIG. 6 are viewed along F7-F7.

As illustrated in FIGS. 6 and 7, the gap adjusting mechanism 90 includes a cam member 94 (a gap adjusting member) attached to the one end of the rotating shaft 412 of the photoconductive drum 41, a screw 95 (a fixing member) that fixes the cam member 94 to the housing 101, a bearing 96 attached to the one end of the rotating shaft 433 of the developing roller 431, a spring 97 (an urging member), and a link arm 98.

The cam member 94 includes a shaft hole 941 that rotatably receives the one end of the rotating shaft 412. The cam member 94 includes, at a distal end of a turn centering on the rotating shaft 412, a cam surface 942 that comes into contact with an outer race 963 of the bearing 96. The cam surface 942 is a curved surface, the distance of which from the center of the rotating shaft 412 gradually increases in the direction of the turn. The cam member 94 includes an attachment hole 943 for attaching the screw 95.

The bearing 96 is a ball bearing including an inner race 961, a plurality of balls 962, and the outer lace 963. The inner race 961 is fixed to the rotating shaft 433 of the developing roller 431. The outer race 963 is capable of rotating with respect to the inner race 961. That is, the outer circumferential surface of the outer race 963 comes into contact with the cam surface 942 of the cam member 94 and an interval between the one end of the rotating shaft 412 of the photoconductive drum 41 and the one end of the rotating shaft 433 of the developing roller 431 is determined.

The housing 101 of the image forming apparatus 100 rotatably supports one end of the link arm 98. The link arm 98 includes a turning shaft 981 at the one end of the link arm 98. The link arm 98 includes a shaft hole 982 through which the rotating shaft 412 of the photoconductive drum 41 is rotatably inserted. The shaft hole 982 is present in an intermediate part in the longitudinal direction of the link arm 98 separated from the turning shaft 981. Further, in the link arm 98, one end of the spring 97 is fixed to a distal end of the turn. The spring 97 is attached between the distal end of the link arm 98 and the housing 101 in a state in which the spring 97 is stretched and elastically deformed. That is, the link arm 98 is urged in an arrow direction in FIG. 7 by a restoring force of the spring 97 and presses the cam surface 942 of the cam member 94 against the bearing 96.

The housing 101 includes a slide groove 104 that slidably receives the screw 95 attached to the attachment hole 943 of the cam member 94. The slide groove 104 is an arcuate groove centering on the rotating shaft 412 of the photoconductive drum 41. That is, the cam member 94 can be fixed to the housing 101 in a desired turning position by fixing the screw 95 to the housing 101 in a state in which the screw 95 is slid to a predetermined turning position along the slide groove 104.

If the gap G is adjusted by the gap adjusting mechanism 90 having the structure explained above, the image forming apparatus 100 is operated to form a test image on the paper P in a state in which the cam member 94 is fixed to the housing 101 and the distance between the one end of the rotating shaft 412 of the photoconductive drum 41 and the one end of the rotating shaft 433 of the developing roller 431 is fixed. In this case, the test image is desirably, for example, a half-tone solid image.

The operator views the test image, finely adjusts a tuning position of the cam member 94, and adjusts the concentration of the test image to be uniform on the front side and the rear side of the paper P. For example, if the rear side of the test image is denser than the front side, the operator turn the cam member 94 in a direction in which the gap G between the photoconductive drum 41 and the developing roller 431 increases and fixes the cam member 94 to the housing 101 in the position of the turn. A turning direction of the cam member 94 in this case is the clockwise direction in FIG. 7. Conversely, if the rear side of the test image is thinner than the front side, the operator turns the cam member 94 in the opposite direction and fixes the cam member 94 to the housing 101. The operator repeats the adjustment until the concentration of the test image is made uniform and ends the adjustment.

As explained above, if the gap adjusting mechanism 90 in the first embodiment is used, it is possible to finely adjust the distance between the one end of the rotating shaft 412 of the photoconductive drum 41 and the one end of the rotating shaft 433 of the developing roller 431. It is possible to make the gap G between the surface 411 of the photoconductive drum 41 and the surface 432 of the developing roller 431 uniform in the axial direction. Note that "uniform" in this case means that the concentration of the test image is made uniform on the front side and the rear side besides that a physical distance is fixed. The gap G is not always physically made uniform in the axial direction. In any case, according to this embodiment, it is possible to perform adjustment for preventing concentration unevenness of an image output to the paper P.

According to this embodiment, since a target object with which the cam surface 942 of the cam member 94 is brought into contact is the bearing 96, it is possible to accurately position and dispose the one end of the rotating shaft 412 of the photoconductive drum 41 with respect to the one end of the rotating shaft 433 of the developing roller 431. It is possible to surely prevent concentration unevenness. That is, the bearing 96 has little axial deviation with respect to the rotating shaft 433 of the developing roller 431. The outer circumferential surface of the outer race 963 can be accurately disposed on a circle concentric with the rotating shaft 433. An adjustment standard can be provided at high accuracy.

Figure 8:
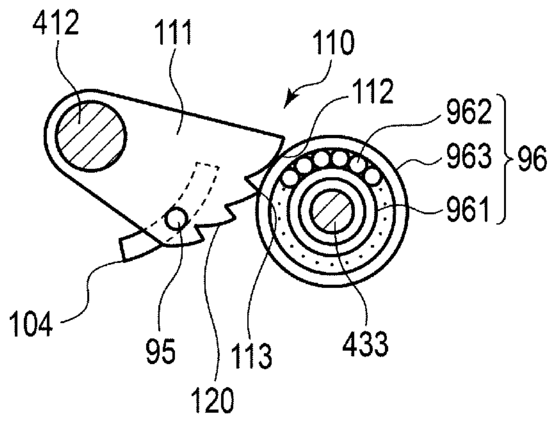
FIG. 8 is a front view illustrating a main part of a gap adjusting mechanism according to a second embodiment.

FIG. 8 is a schematic diagram illustrating a main part of a gap adjusting mechanism 110 according to a second embodiment. The gap adjustment mechanism 110 in the second embodiment is the same as the gap adjusting mechanism 90 in the first embodiment explained above except that the shape of a cam surface of the cam member 94 is different. Accordingly, components having the same functions as the functions in the gap adjusting mechanism 90 in the first embodiment are denoted by the same reference numerals and signs and detailed explanation of the components is omitted.

A cam surface 120 of a cam member 111 is an uneven surface including a plurality of contact sections 112, 113, . . . , distances of which from a turning center decrease stepwise in a turning direction centering on the rotating shaft 412 of the photoconductive drum 41. By forming the cam surface 120 as the uneven surface in this way, a turning position of the cam member 111 can be adjusted stepwise. That is, according to the second embodiment, the fine adjustment in the first embodiment cannot be performed. However, adjustment work can be facilitated and convenience can be improved.

While certain embodiment have been described, this embodiment has been presented by way of example only, and is not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:

a cylindrical image bearing body including a first rotating shaft and a first surface on which a latent image is formed;

a developing roller including a second rotating shaft, a second surface opposed to the first surface of the image bearing body via a gap, and a bearing at one end of the second rotating shaft, and configured to supply a developer to the latent image and develop the latent image;

a housing configured to rotatably support the second rotating shaft of the developing roller; and a gap adjusting member including a shaft hole for rotatably receiving one end of the first rotating shaft of the image bearing body opposed to the one end of the second rotating shaft of the developing roller and a cam surface, a distance of which from a center of the shaft hole varies in a turning direction, the gap adjusting member configured to turn around the first rotating shaft in a state in which the cam surface is set in contact with the bearing, the gap adjusting member fixed to the housing in a turning position where the gap is uniform in a direction of the second rotating shaft of the developing roller.

2. The image forming apparatus according to claim 1, wherein the bearing is a ball bearing including an inner race fixed to the one end of the second rotating shaft of the developing roller and an outer race configured to turn with respect to the inner race, and the cam surface of the gap adjusting member comes into contact with an outer circumferential surface of the outer race of the ball bearing.

3. The image forming apparatus according to claim 1, wherein the cam surface of the gap adjusting member has a curved surface, a distance of which from the shaft hole gradually increases in a turning direction centering on the shaft hole of the gap adjusting member.

4. The image forming apparatus according to claim 1, wherein the cam surface of the gap adjusting member is an uneven surface including a plurality of contact sections, a distance of the uneven surface from the shaft hole gradually increasing in a turning direction centering on the shaft hole of the gap adjusting member.

5. The image forming apparatus according to claim 1, further comprising a fixing member configured to fix the gap adjusting member to the housing in a predetermined turning position.

6. The image forming apparatus according to claim 1, further comprising:

a first gear attached to the first rotating shaft of the image bearing body; and a second gear attached to the second rotating shaft of the developing roller and configured to mesh with the first gear to transmit a driving force.

7. The image forming apparatus according to claim 1, further comprising:

a transfer component configured to transfer, onto a transfer medium, a developer image obtained by developing the latent image on the first surface of the image bearing body with the developer supplied from the developing roller; and a fixing component configured to fix the developer image transferred onto the transfer medium.

8. The image forming apparatus according to claim 1, further comprising a bearing member including a first bearing section configured to rotatably receive another end of the first rotating shaft of the image bearing body and a second bearing section configured to rotatably receive another end of the second rotating shaft of the developing roller.

9. The image forming apparatus according to claim 1, further comprising a restricting member configured to restrict an amount of the developer on the second surface of the developing roller in order to form a developer layer having fixed thickness on the second surface.

10. The image forming apparatus according to claim 1, further comprising an urging member configured to urge the one end of the first rotating shaft of the image bearing body toward the one end of the second rotating shaft of the developing roller to press the cam surface of the gap adjusting member against the bearing.

11. The image forming apparatus according to claim 1, wherein the image forming apparatus is a multifunction peripheral or a color copying machine.

12. A two component developer image forming apparatus, comprising:

a cylindrical image bearing body including a first rotating shaft and a first surface on which a latent image is formed;

a developing roller including a second rotating shaft, a second surface opposed to the first surface of the image bearing body via a gap, and a bearing at one end of the second rotating shaft, and configured to supply a two component developer to the latent image and develop the latent image;

a housing configured to rotatably support the second rotating shaft of the developing roller; and a gap adjusting member including a shaft hole for rotatably receiving one end of the first rotating shaft of the image bearing body opposed to the one end of the second rotating shaft of the developing roller and a cam surface, a distance of which from a center of the shaft hole varies in a turning direction, the gap adjusting member configured to turn around the first rotating shaft in a state in which the cam surface is set in contact with the bearing, the gap adjusting member fixed to the housing in a turning position where the gap is uniform in a direction of the second rotating shaft of the developing roller.

13. The two component developer image forming apparatus according to claim 12, wherein the bearing is a ball bearing including an inner race fixed to the one end of the second rotating shaft of the developing roller and an outer race configured to turn with respect to the inner race, and the cam surface of the gap adjusting member comes into contact with an outer circumferential surface of the outer race of the ball bearing.

14. The two component developer image forming apparatus according to claim 12, wherein the cam surface of the gap adjusting member has a curved surface, a distance of which from the shaft hole gradually increases in a turning direction centering on the shaft hole of the gap adjusting member.

15. The two component developer image forming apparatus according to claim 12, wherein the cam surface of the gap adjusting member is an uneven surface including a plurality of contact sections, a distance of the uneven surface from the shaft hole gradually increasing in a turning direction centering on the shaft hole of the gap adjusting member.

16. The two component developer image forming apparatus according to claim 12, further comprising a fixing member configured to fix the gap adjusting member to the housing in a predetermined turning position.

17. The two component developer image forming apparatus according to claim 12, further comprising:

a first gear attached to the first rotating shaft of the image bearing body; and a second gear attached to the second rotating shaft of the developing roller and configured to mesh with the first gear to transmit a driving force.

18. The two component developer image forming apparatus according to claim 12, further comprising:

a transfer component configured to transfer, onto a transfer medium, a developer image obtained by developing the latent image on the first surface of the image bearing body with the two component developer supplied from the developing roller; and a fixing component configured to fix the developer image transferred onto the transfer medium.

19. The two component developer image forming apparatus according to claim 12, further comprising a bearing member including a first bearing section configured to rotatably receive another end of the first rotating shaft of the image bearing body and a second bearing section configured to rotatably receive another end of the second rotating shaft of the developing roller.

20. The two component developer image forming apparatus according to claim 12, further comprising a restricting member configured to restrict an amount of the two component developer on the second surface of the developing roller in order to form a developer layer having fixed thickness on the second surface.

* * * * *